United States Patent
Yanagibayashi

(10) Patent No.: US 11,703,164 B2
(45) Date of Patent: Jul. 18, 2023

(54) RATCHET FITTING, PIPE CONNECTING STRUCTURE AND LIQUID CHROMATOGRAPH

(71) Applicant: SHIMADZU CORPORATION, Kyoto (JP)

(72) Inventor: Jun Yanagibayashi, Kyoto (JP)

(73) Assignee: Shimadzu Corporation, Kyoto (JP)

(*) Notice: Subject to any disclaimer, the term of this patent is extended or adjusted under 35 U.S.C. 154(b) by 0 days.

(21) Appl. No.: 17/739,610

(22) Filed: May 9, 2022

(65) Prior Publication Data
US 2022/0403958 A1      Dec. 22, 2022

(30) Foreign Application Priority Data
Jun. 17, 2021   (JP) .................... 2021-100828

(51) Int. Cl.
*F16L 15/08*       (2006.01)
*F16L 35/00*       (2006.01)

(52) U.S. Cl.
CPC .............. *F16L 15/08* (2013.01); *F16L 35/00* (2013.01)

(58) Field of Classification Search
CPC . F16L 15/08; F16L 37/24; F16L 47/04; F16L 47/16; G01N 30/6004; G01N 30/6026
See application file for complete search history.

(56) References Cited

U.S. PATENT DOCUMENTS

| | | | |
|---|---|---|---|
| 4,451,364 A * | 5/1984 | Higgins ............. | G01N 30/6026 285/109 |
| 7,984,933 B2 | 7/2011 | Helstern | |
| 8,235,741 B2 * | 8/2012 | Schulze ............... | H01R 13/622 439/339 |
| 9,194,417 B2 | 11/2015 | Marchand et al. | |
| 9,303,800 B2 * | 4/2016 | Collin ................. | F16L 19/0206 |
| 9,310,008 B2 | 4/2016 | Beemer et al. | |
| 9,791,080 B2 | 10/2017 | Graham | |
| 11,149,890 B2 | 10/2021 | Beemer et al. | |

FOREIGN PATENT DOCUMENTS

JP      2015-512053 A      4/2015

* cited by examiner

*Primary Examiner* — David Bochna
(74) *Attorney, Agent, or Firm* — Renner, Otto, Boisselle & Sklar, LLP

(57) ABSTRACT

A ratchet fitting includes a screw portion and an operating portion. One of the screw portion and the operating portion has an engaging member, and the other one of the screw portion and the operating portion has an elastic member and a holding member formed separately from the elastic member. The elastic member and the engaging member are fitted such that a rotational force is transmittable to each other due to engagement of the projection and the protrusion and engagement between the projection and the protrusion is releasable due to deformation of the elastic member. The elastic member has a first fitting portion, the holding member has a second fitting portion, and the holding member and the elastic member are fitted such that the first fitting portion and the second fitting portion are fitted to each other in a rotation direction.

8 Claims, 9 Drawing Sheets

RATCHET FITTING, PIPE CONNECTING STRUCTURE AND LIQUID CHROMATOGRAPH

BACKGROUND

Technical Field

The present invention relates to a ratchet fitting, a pipe connecting structure and a liquid chromatograph.

Description of Related Art

JP 2015-512053 A describes a torque limiting connector for connecting pipes of a chromatograph or the like. The torque limiting connector includes a head portion and a body portion. The head portion is fitted to the upper end portion of the main body, and a pipe is inserted into the head portion and the main body. When a torque equal to or smaller than a torque prescribed value is applied to the head portion, the head portion and the main body are rotatable integrally. On the other hand, when a torque larger than the torque prescribed value is applied to the head portion, the head portion runs idle with respect to the main body. Therefore, a torque larger than the torque prescribed value is not applied to the main body.

SUMMARY

In the torque limiting connector described in JP 2015-512053 A, an abutment (projection) having an inclined portion is provided on the inner peripheral surface of the head portion. A slot that extends circumferentially is formed in the body portion. A portion of the body portion that is located farther upwardly than the slot (hereinafter referred to as an upper portion) and a portion of the main body that is located farther downwardly than the slot (hereinafter referred to as a lower portion) are integrated via a portion other than the slot (hereinafter referred to as a connecting portion). The lower portion of the body portion is provided with a male threaded portion. An abutment is provided on the outer peripheral surface of the upper portion of the main body so as to extend in the axial direction.

The head portion is fitted to the upper portion of the body portion such that the abutment of the head portion and the abutment of the body portion engage with each other in the circumferential direction. Thus, when a torque equal to or smaller than a torque prescribed value is applied to the head portion, the head portion and the main body are rotatable integrally. On the other hand, when a torque larger than the torque prescribed value is applied to the head portion, the upper portion of the main body is deformed. In this case, the abutment of the main body is inwardly deformed, so that the engagement between the abutment of the head portion and the abutment of the main body is released. Thus, the head portion idles with respect to the body portion. Therefore, a torque larger than the torque prescribed value is not applied to the main body.

However, the lower end of the upper portion and the upper end of the lower portion of the main body are integrated in the connecting portion. The upper end of the upper portion of the body portion is open. Therefore, although the upper end of the upper portion of the main body is likely to be deformed, the lower end of the upper portion of the main body is unlikely to be deformed. Thus, deformation of the abutment may not be uniform in an axial direction when a torque is applied to the upper portion of the main body. As a result, a torque prescribed value may vary.

An object of the present invention is to provide a ratchet fitting a torque prescribed value of which has improved accuracy, a pipe connecting structure in which the ratchet fitting is used and a liquid chromatograph in which the pipe connecting structure is used.

A ratchet fitting according to one aspect of the present invention used for connecting a pipe of a chromatograph includes a screw portion that is rotatable about an axis extending in one direction, and an operating portion that applies a torque around the axis to the screw portion, wherein one of the screw portion and the operating portion has an engaging member having an inner peripheral surface, another one of the screw portion and the operating portion has an elastic member having an outer peripheral surface and a holding member formed separately from the elastic member, a projection projecting inwardly is provided on the inner peripheral surface of the engaging member, a protrusion protruding outwardly is provided on the outer peripheral surface of the elastic member, the elastic member and the engaging member are fitted such that a rotational force is transmittable to each other due to engagement of the projection and the protrusion and engagement between the projection and the protrusion is releasable due to deformation of the elastic member, the elastic member has a first fitting portion, the holding member has a second fitting portion, and the holding member and the elastic member are fitted such that the first fitting portion and the second fitting portion are fitted to each other in a rotation direction.

Other features, elements, characteristics, and advantages of the present disclosure will become more apparent from the following description of preferred embodiments of the present disclosure with reference to the attached drawings.

DETAILED DESCRIPTION

A ratchet fitting and a connecting structure using the ratchet fitting according to one embodiment of the present invention will be described below in detail with reference to the drawings.

(1) Configuration of Ratchet Fitting

Figure 1:
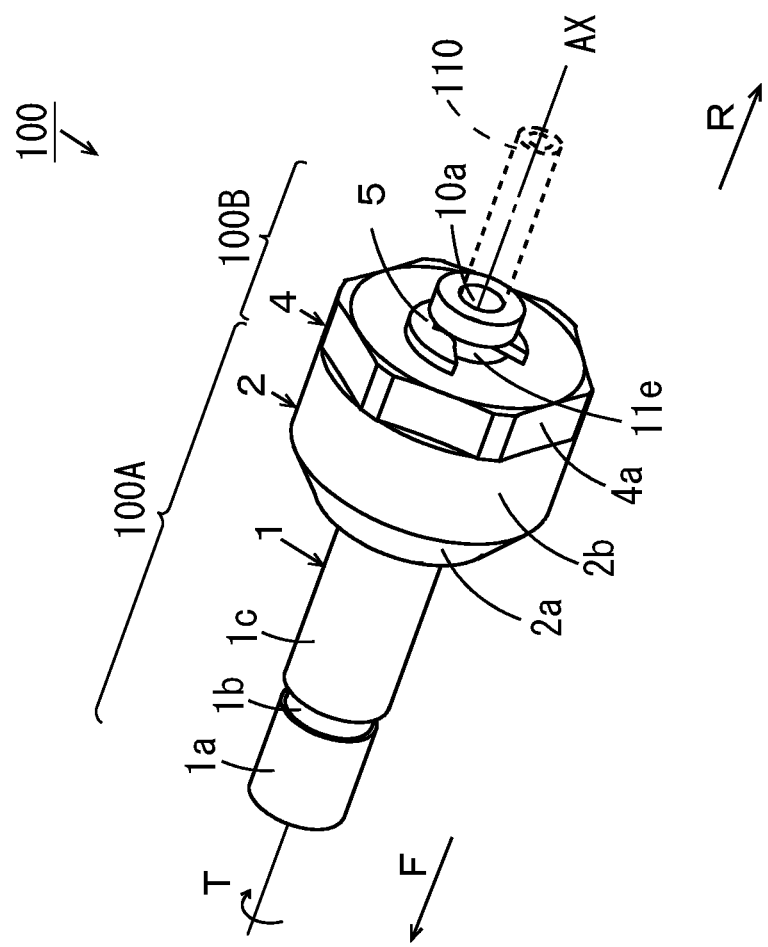
FIG. 1 is a perspective view of a ratchet fitting according to one embodiment.
Figure 2:
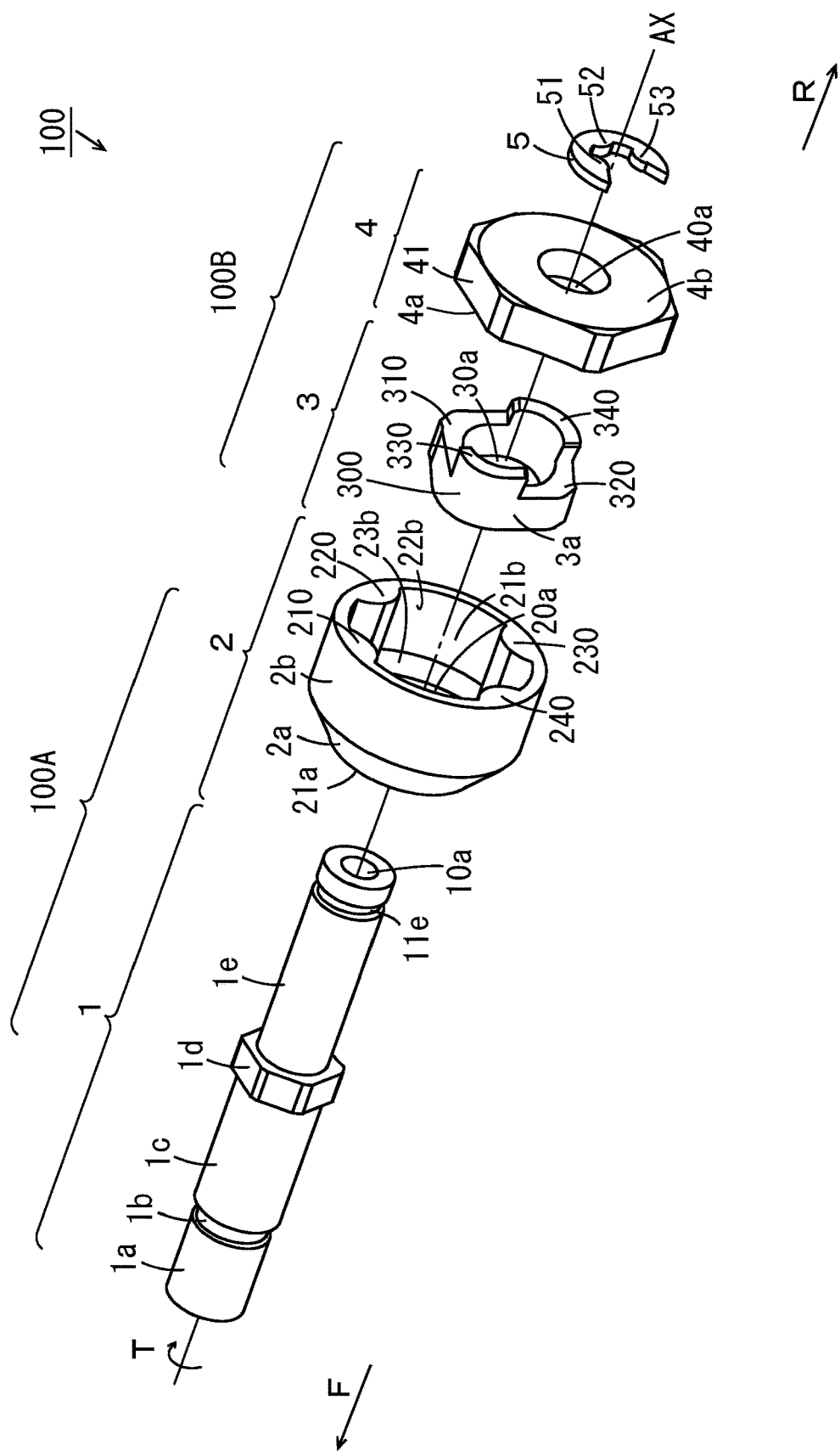
FIG. 2 is an exploded perspective view of the ratchet fitting of FIG. 1 as viewed obliquely downwardly.
Figure 3:
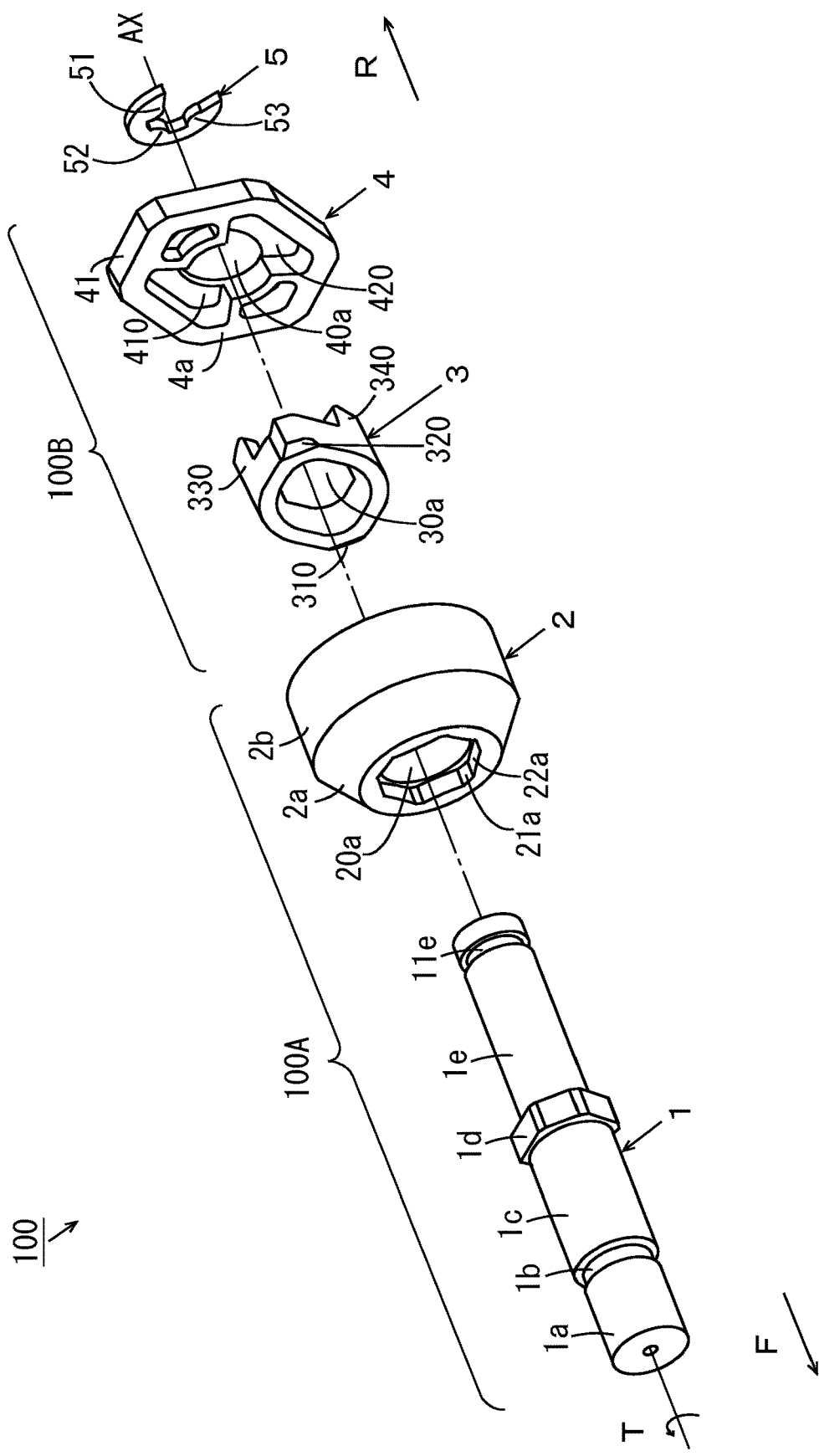
FIG. 3 is an exploded perspective view of the ratchet fitting of FIG. 1 as viewed from an obliquely forward position.

FIG. 1 is a perspective view of the ratchet fitting according to the one embodiment. FIG. 2 is an exploded perspective view of the ratchet fitting of FIG. 1 as viewed from an obliquely downward position. FIG. 3 is an exploded perspective view of the ratchet fitting of FIG. 1 as viewed from an obliquely forward position. In each of FIGS. 1, 2 and 3, forward F and rearward R are respectively indicated by the arrows.

The ratchet fitting 100 of FIG. 1 includes a male nut 1, a main body 2, a spring 3 (see FIGS. 2 and 3), a head 4 and a fixing plate 5. The male nut 1, the main body 2 and the fixing plate 5 constitute a screw portion 100A, and the spring 3 and the head 4 constitute an operating portion 100B.

As shown in FIGS. 2 and 3, the male nut 1 has a male threaded portion 1a, cylindrical portions 1b, 1c, an engaging portion 1d and a cylindrical portion 1e in this order. In the present embodiment, the male threaded portion 1a, the cylindrical portions 1b, 1c, the engaging portion 1d and the cylindrical portion 1e are integrally formed of a stainless steel. The male nut 1 may be formed of another metal such as aluminum or a hard resin material. A linear communication hole 10a is formed in the male threaded portion 1a, the cylindrical portions 1b, 1c, the engaging portion 1d and the cylindrical portion 1e to cause the male threaded portion 1a, the cylindrical portions 1b, 1c, the engaging portion 1d and the cylindrical portion 1e to communicate with one another. Hereinafter, the center axis of the communication hole is referred to as an axis AX. The direction in which the axis AX extends is referred to as an axial direction. As indicated by the one-dot and dash line in FIG. 1, a pipe 110 is inserted into the communication hole 10a. In the present embodiment, the ratchet fitting 100 of FIGS. 1 to 3 is used for a liquid chromatograph. The ratchet fitting 100 of FIGS. 1 to 3 may be used for another chromatograph such as a supercritical fluid liquid chromatograph.

The male threaded portion 1a is cylindrical. A male thread is formed on the outer peripheral surface of the male threaded portion 1a. Hereinafter, a rotation direction for fastening the male threaded portion is referred to as a fastening direction T. In the present embodiment, the cylindrical portion 1b has an outer diameter smaller than that of the cylindrical portion 1c. The engaging portion 1d has a hexagonal cross section. An annular groove portion 11e is formed in the vicinity of the rear end of the outer peripheral surface of the cylindrical portion 1e.

The main body 2 includes a tapered portion 2a and a cylindrical portion 2b. The tapered portion 2a has an outer diameter that gradually decreases forward F from the cylindrical portion 2b. As shown in FIG. 3, an opening 21a that opens forward F is formed in the tapered portion 2a. An inner peripheral surface 22a having a hexagonal cross section corresponding to the hexagonal cross section of the engaging portion 1d of the male nut 1 is formed in the opening 21a.

As shown in FIG. 2, an opening 21b that opens rearward R is formed in the cylindrical portion 2b. The opening 21b has an inner peripheral surface 22b having a circular cross section. A plurality of projections are provided on the inner peripheral surface 22b of the opening 21b so as to respectively extend in the axial direction. The plurality of projections are arranged at equal angular intervals around the axis AX. In the present embodiment, four projections 210, 220, 230, 240 are provided. The cylindrical portion 2b has an annular abutment surface 23b surrounding the opening 21b. The opening 21a of the tapered portion 2a and the opening 21b of the cylindrical portion 2b communicate with each other through a through hole 20a.

The tapered portion 2a and the cylindrical portion 2b of the main body 2 are integrally formed of resin. In the present embodiment, the main body 2 is formed of PEEK (polyether ether ketone). The main body 2 may be formed of another resin such as PTFE (polytetrafluoroethylene).

The spring 3 includes an annular portion 300, a plurality of protrusions 310, 320 and a plurality of convex portions 330, 340. The annular portion 300 has a substantially circular or substantially oval cross section. The annular portion 300 has a through hole 30a. The plurality of protrusions 310, 320 are formed on the outer peripheral surface of the annular portion 300 so as to extend outwardly of the annular portion 300. Further, the plurality of protrusions 310, 320 are arranged at equal angular intervals around the axis AX. In the present embodiment, the two protrusions 310, 320 are formed at positions symmetrical to each other about the axis AX.

The plurality of convex portions 330, 340 are formed so as to extend rearwardly and in the axial direction from the rear end surface of the annular portion 300. Further, the plurality of convex portions 330, 340 are arranged at equal angular intervals around the axis AX. In the present embodiment, the two convex portions 330, 340 are formed at positions symmetrical to each other about the axis AX.

The spring 3 is formed of an elastic material which is can be deformed and has a restoring force. In the present embodiment, the annular portion 300, the plurality of protrusions 310, 320 and the plurality of convex portions 330, 340 of the spring 3 are integrally formed of resin. In the present embodiment, the spring 3 is formed of PEEK (polyether ether ketone). The spring 3 may be formed of another resin such as PTFE (polytetrafluoroethylene) softer than the male nut 1.

The head 4 has a front end surface 4a shown in FIG. 3 and a rear end surface 4b shown in FIG. 2 and has an outer peripheral surface 41 parallel to the axial direction. A through hole 40a is provided in the center portion of the head 4. As shown in FIG. 3, a plurality of concave portions 410, 420 are formed in the front end surface 4a of the head 4. The plurality of concave portions 410, 420 are arranged at equal angular intervals around the through hole 40a so as to correspond to the plurality of convex portions 330, 340 of the spring 3. The plurality of convex portions 330, 340 can be fitted to the plurality of concave portions 410, 420. In the present embodiment, the two concave portions 410, 420 are formed at positions symmetrical to each other about the axis AX.

The head 4 is made of resin. In the present embodiment, the head 4 is formed of PEEK (polyether ether ketone). The head 4 may be formed of another resin such as PTFE (polytetrafluoroethylene).

The fixing plate 5 has an arc shape. Protrusions 51, 52, 53 protruding inwardly are formed on the fixing plate 5. The protrusions 51, 52, 53 are formed so as to be attachable to the groove portion 11e of the cylindrical portion 1e of the male nut 1.

As shown in FIGS. 2 and 3, when the ratchet fitting 100 is assembled, the cylindrical portion 1e of the male nut 1 is fitted to the main body 2, the spring 3 and the head 4. In this state, the hexagonal inner peripheral surface of the opening 21*a* of the tapered portion 2*a* of the main body 2 engages with the hexagonal engaging portion 1*d* of the male nut 1. Thus, the main body 2 is non-rotatably fixed to the male nut 1. The spring 3 is accommodated in the opening 21*b* of the cylindrical portion 2*b* of the main body 2. Further, the convex portions 330, 340 of the spring 3 are fitted to the concave portions 410, 420 of the head 4. The front end surface 4*a* of the head 4 rotatably comes into contact with the rear end surface of the main body 2. The rear end of the cylindrical portion 1*e* of the male nut 1 projects rearward R from the through hole 40*a* of the head 4. As shown in FIG. 1, the protrusions 51 to 53 of the fixing plate 5 are fitted to the groove portion 11*e* of the cylindrical portion 1*e* protruding from the head 4. Thus, the spring 3 and the head 4 are rotatably attached to the male nut 1 and the main body 2.

(2) Engagement of Main Body 2 and Spring 3

Figure 4:
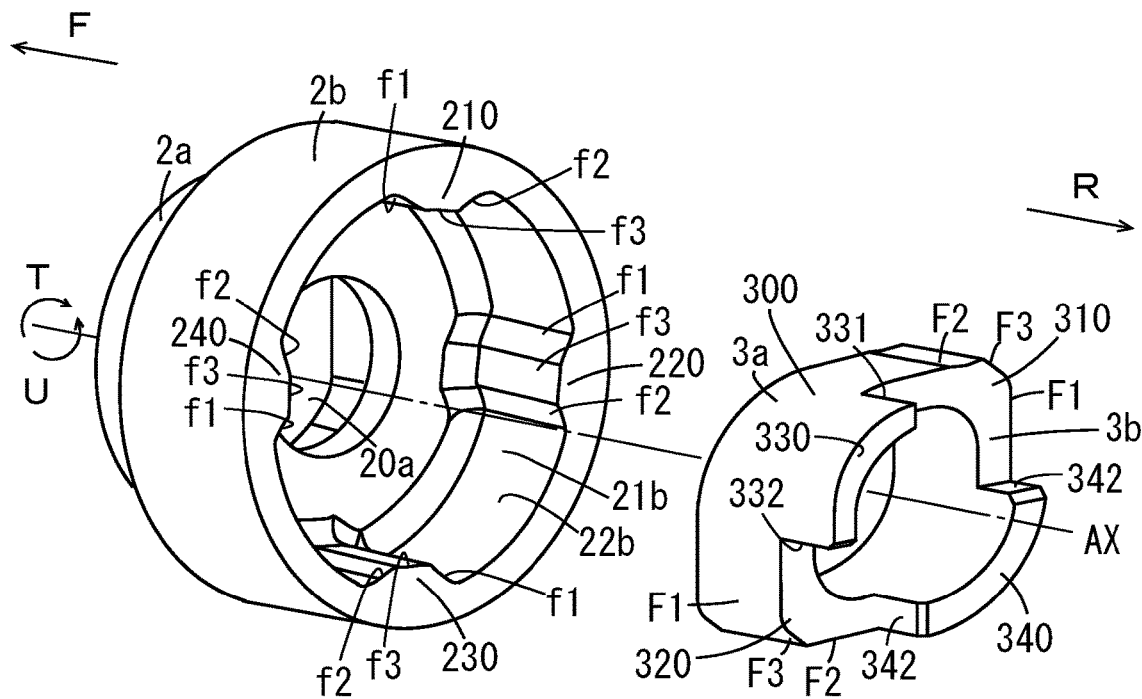
FIG. 4 is an enlarged perspective view of a main body 2 and a spring 3 of FIGS. 2 and 3.
Figure 5:
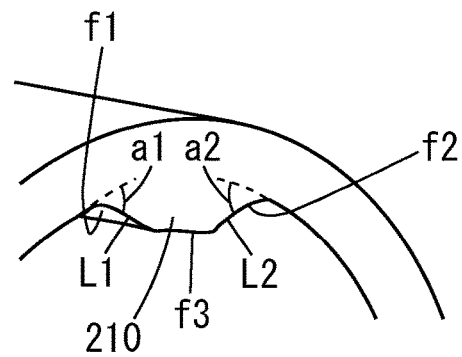
FIG. 5 is an enlarged perspective view of the main body of FIG. 4.
Figure 6:
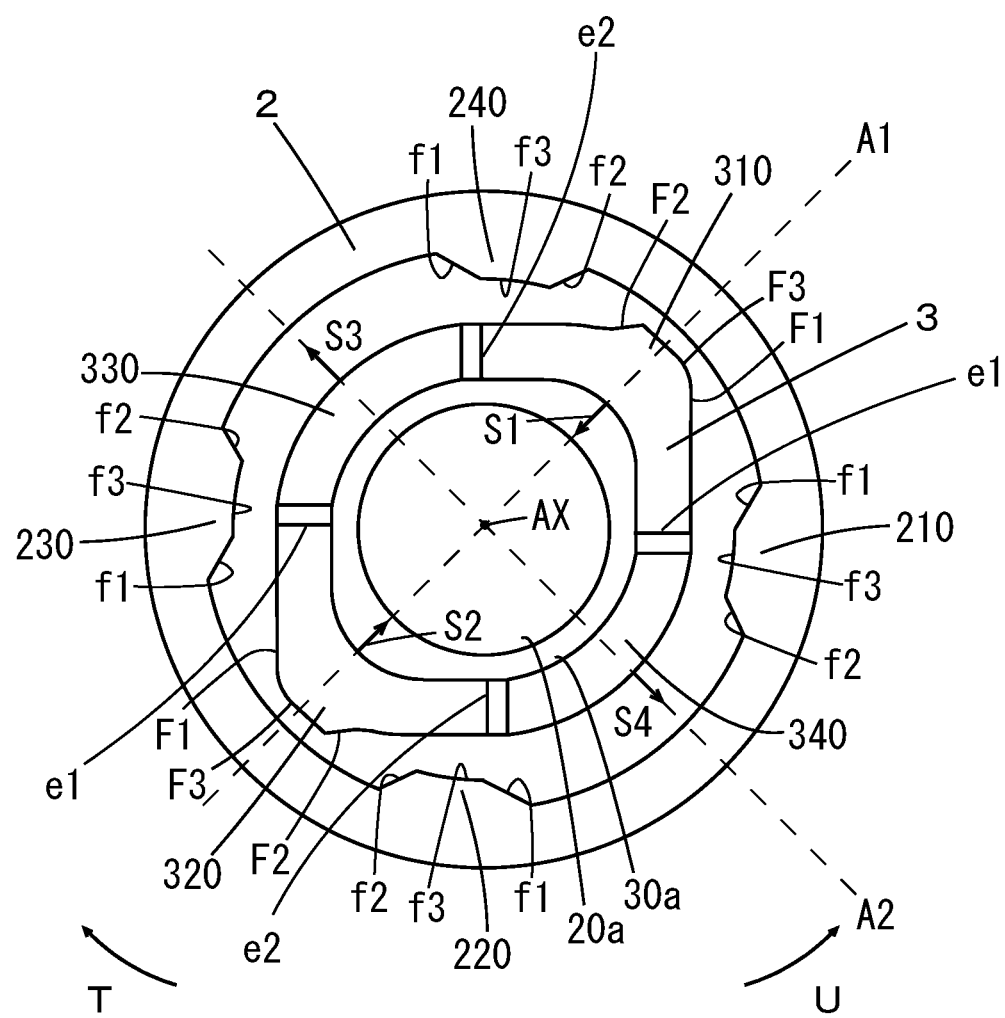
FIG. 6 is a plan view showing the spring accommodated in the main body of FIG. 4.

FIG. 4 is an enlarged perspective view of the main body 2 and the spring 3 of FIGS. 2 and 3. FIG. 5 is an enlarged perspective view of the main body 2 of FIG. 4. FIG. 6 is a plan view showing the spring 3 accommodated in the main body 2 of FIG. 4. FIG. 6 is a rear view of the main body 2 and the spring 3 (as viewed in the axial direction from a rear position).

Each of the projections 210 to 240 of the main body 2 has engaged surfaces f1, f2 and an intermediate surface f3. The engaged surface f1 is formed so as to be inclined inwardly from the inner peripheral surface 22*b* of the cylindrical portion 2*b* in the fastening direction T. The engaged surface f2 is formed to be inclined inwardly from the inner peripheral surface 22*b* of the cylindrical portion 2*b* in the direction opposite to the fastening direction T (hereinafter referred to as a releasing direction U). The intermediate surface f3 has a circular cross section centered at the axis AX and is formed so as to connect the engaged surface f1 and the engaged surface f2 to each other.

As shown in FIG. 5, an angle a1 formed by the engaged surface f1 and the inner peripheral surface 22*b* in the fastening direction T is smaller than an angle a2 formed by the engaged surface f2 and the inner peripheral surface 22*b* in the releasing direction. A length L1 of the engaged surface f1 in the circumferential direction is larger than a length L2 of the engaged surface f2 in the circumferential direction.

As shown in FIG. 6, each of the protrusions 310, 320 of the spring 3 has engaging surfaces F1, F2 and an intermediate surface F3. The engaging surface F1 is formed in a flat shape and extends from an outer peripheral surface 3*a* of the annular portion 300 to the intermediate surface F3 in the releasing direction U. The engaging surface F2 is formed so as to be slightly curved in a concave shape and extends from the outer peripheral surface 3*a* of the annular portion 300 to the intermediate surface F3 in the fastening direction T. The intermediate surface F3 has a circular cross section centered at the axis AX. Here, in the rear view of FIG. 6, an axis passing through the center of the intermediate surface F3 of the protrusions 310, 320 is referred to as an axis A1. The axis orthogonal to the axis A1 is referred to as an axis A2. The axes A1, A2 are orthogonal to the axis AX.

The length of the spring 3 in the direction of the axis A1 (the length between the center of the intermediate surface F3 of the protrusion 310 and the center of the intermediate surface F3 of the protrusion 320) is larger than the length of the spring 3 in the direction of the axis A2. That is, the length from the axis AX to the intermediate surface F3 of the protrusion 310 is larger than the length from the axis AX to one outer peripheral surface of the annular portion 300 in the direction of the axis A2. That is, the length from the axis AX to the intermediate surface F3 of the protrusion 320 is larger than the length from the axis AX to the other outer peripheral surface of the annular portion 300 in the direction of the axis A2.

In a case in which the spring 3 rotates about the axis AX in the fastening direction T with a torque equal to or smaller than a predetermined torque prescribed value, the engaging surface F1 of the protrusion 310 of the spring 3 comes into contact with the engaging surface F1 of the projection 210 of the main body 2, and the engaging surface F1 of the protrusion 320 of the spring 3 comes into contact with the engaged surface f1 of the projection 230 of the main body 2. Thus, the spring 3 engages with the main body 2. As a result, the main body 2 rotates in the fastening direction T together with the spring 3.

In this state, when the spring 3 rotates about the axis AX in the fastening direction T with a torque larger than the torque prescribed value, reaction forces exerted on the engaged surfaces f1 of the projections 210, 230 are applied to the protrusions 310, 320. Thus, the protrusions 310, 320 are respectively deformed inwardly toward the axis AX as indicated by the arrows S1 and S2. As a result, the annular portion 300 between the protrusions 310, 320 of the spring 3 is deformed outwardly away from the axis AX as indicated by the arrows S3 and S4. In this manner, the spring 3 is compressed in the direction of the axis A1 and expanded in the direction of the axis A2. In this case, the protrusions 310, 320 of the spring 3 can climb over the projections 210 to 240 of the main body 2. Thus, the spring 3 is disengaged from the main body 2. As a result, the spring 3 runs idle with respect to the main body 2.

With such a configuration, even in a case in which a torque larger than the torque prescribed value is applied to the spring 3 in the fastening direction T, a torque larger than the torque prescribed value is not applied to the main body 2.

On the other hand, in a case in which the spring 3 rotates about the axis AX in the releasing direction U with any torque, the engaging surface F2 of the protrusion 310 of the spring 3 comes into contact with the engaged surface f2 of the projection 210 of the main body 2, and the engaging surface F2 of the protrusion 320 of the spring 3 comes into contact with the engaged surface f2 of the projection 230 of the main body 2. Thus, the spring 3 engages with the main body 2. As a result, the main body 2 rotates in the releasing direction U together with the spring 3.

In this case, the angle a2 of the engaged surface f2 of each of the projections 210 to 240 of the main body 2 is larger than the angle a1 of the engaged surface f1, and the engaging surface F2 of each of the protrusions 310, 320 of the spring 3 is formed in a concave shape. Therefore, the spring 3 and the main body 2 are unlikely to be disengaged from each other. Therefore, in a case in which a torque larger than the torque prescribed value is applied to the spring 3 in the releasing direction U, the main body 2 rotates in the releasing direction U together with the spring 3.

(3) Fitting of Spring 3 and Head 4

Figure 7:
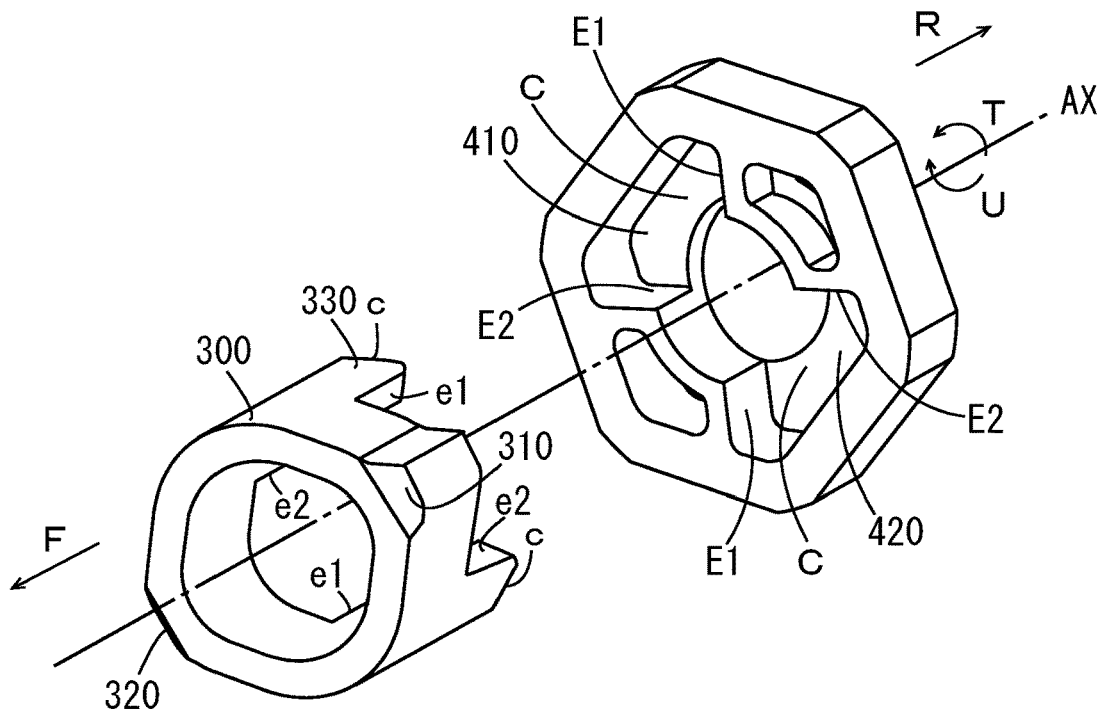
FIG. 7 is an enlarged perspective view of the spring and the head of FIGS. 2 and 3.
Figure 8:
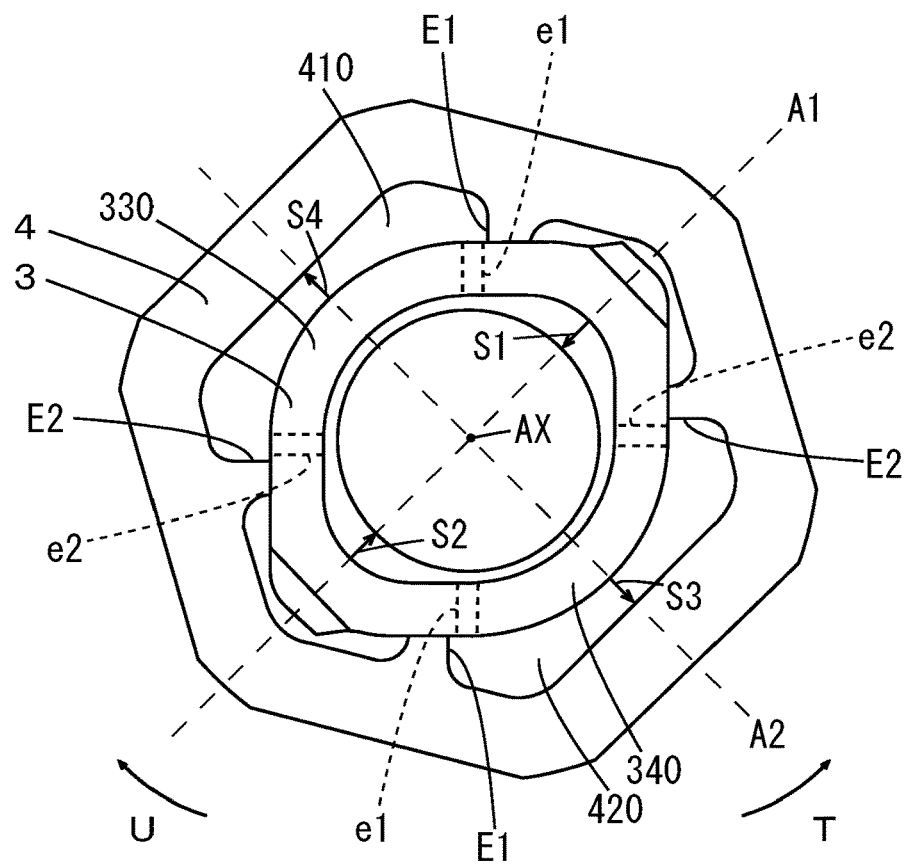
FIG. 8 is a plan view showing the spring fitted to the head of FIG. 7.

FIG. 7 is an enlarged perspective view of the spring 3 and the head 4 of FIGS. 2 and 3. FIG. 8 is a plan view showing the spring 3 being fitted to the head 4 of FIG. 7. FIG. 8 is a front view of the spring 3 and the head 4 (as viewed in the axial direction from the front).

Each of the convex portions 330, 340 of the spring 3 has an abutment surface c and contact surfaces e1, e2. The contact surfaces e1, e2 of each of the convex portions 330, 340 are formed to extend in the axial direction. The abutment surface c of each of the convex portions 330, 340 is formed to be orthogonal to the axis AX so as to connect the contact surface e1 and the contact surface e2 to each other. In the present embodiment, as shown in FIG. 6, the contact surface e1 of each of the convex portions 330, 340 is located at the intermediate position between the center of the intermediate surface F3 of each of the protrusions 310, 320 that are deformed inwardly and the center of the annular portion 300 that is deformed outwardly in a rear view. Preferably, each contact surface e1 is formed at a position that bisects the angle between the axis A1 and the axis A2.

Each of the concave portions 410, 420 of the head 4 has an abutted surface C and contacted surfaces E1, E2. The contacted surfaces E1, E2 are formed so as to extend in parallel with the axial direction and in a radial direction around the axis AX. The abutted surface C of each of the convex portions 330, 340 is formed to be orthogonal to the axis AX so as to connect the contacted surface E1 and the contacted surface E2 to each other.

The convex portions 330, 340 of the spring 3 are fitted to the concave portions 410, 420 of the head 4. In this state, as shown in FIG. 8, when the head 4 rotates in the fastening direction T about the axis AX, the contacted surface E1 of the concave portion 410 comes into contact with the contact surface e1 of the convex portion 330, and the contacted surface E1 of the concave portion 420 comes into contact with the contact surface e1 of the convex portion 340. Thus, the spring 3 rotates integrally with the head 4 in the fastening direction T.

Further, when the head 4 rotates in the releasing direction U about the axis AX, the contacted surface E2 of the concave portion 410 comes into contact with the contact surface e2 of the convex portion 330, and the contacted surface E2 of the concave portion 420 comes into contact with the contact surface e2 of the convex portion 340. Thus, the spring 3 rotates integrally with the head 4 in the releasing direction U.

(4) Example of Pipe Connection by Ratchet Fitting 100

Figure 9:
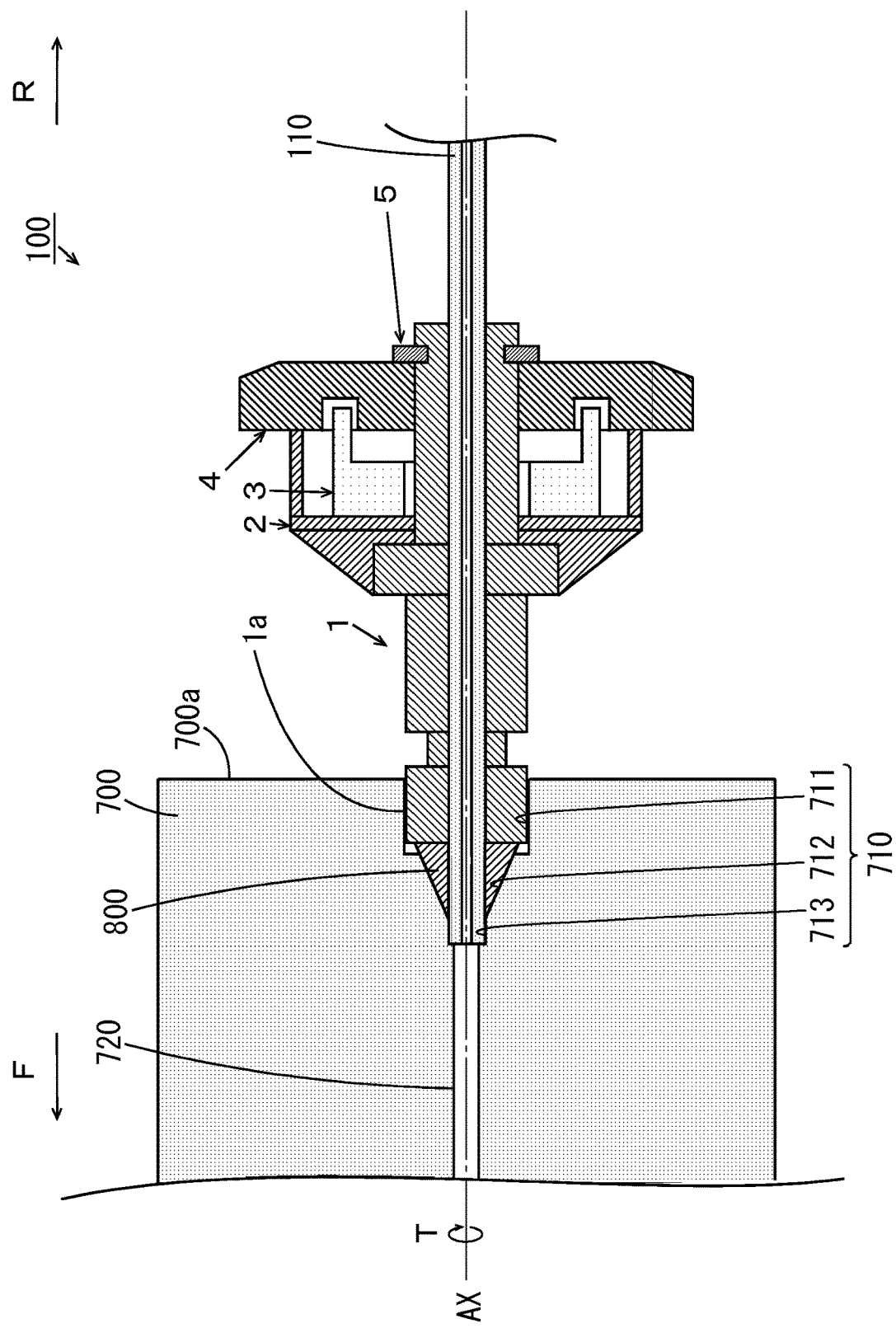
FIG. 9 is a cross sectional view showing a pipe connecting structure in which the ratchet fitting of FIG. 1 is used.

FIG. 9 is a cross sectional view showing the pipe connecting structure in which the ratchet fitting 100 of FIG. 1 is used.

A connected member 700 includes a connected hole 710 and a flow path 720. The connected hole 710 is provided in a rear end surface 700a of the connected member 700. The connected hole 710 includes a female threaded portion 711, a tapered portion 712 and a cylindrical portion 713. The female threaded portion 711, the tapered portion 712 and the cylindrical portion 713 are formed forward F in this order from the rear end surface 700a. A female thread corresponding to the male threaded portion 1a of the male nut 1 of the ratchet fitting 100 is formed on the inner peripheral surface of the female threaded portion 711. The female threaded portion 711 and the cylindrical portion 713 are cylindrical. The inner diameter of the female threaded portion 711 is larger than the inner diameter of the cylindrical portion 713. The inner peripheral surface of the tapered portion 712 has the inner diameter gradually decreasing from the female threaded portion 711 to the cylindrical portion 713. The flow path 720 is formed so as to extend forward F from the cylindrical portion 713 forward F along the axis AX. A pipe 110 is inserted into the ratchet fitting 100. In the present example, a ferrule 800 is attached to the outer peripheral surface of the pipe 110 projecting forwardly from the male threaded portion 1a of the ratchet fitting 100.

The male nut 1 of the ratchet fitting 100 is inserted into the connected hole 710 of the connected member 700. The tapered portion 712 is filled with the ferrule 800. The male threaded portion 1a of the male nut 1 is screwed into the female threaded portion 711 of the connected hole 710. Thus, the pipe 110 is connected to the connected member 700 by the ratchet fitting 100. With this configuration, when the ratchet fitting 100 is fastened, the rear end surface of the ferrule 800 is pressed forwardly by the front end surface of the male threaded portion 1a. Thus, the connected hole 710 and the pipe 110 are sealed by the ferrule 800. In the ratchet fitting 100 of the present embodiment, because a fastening torque is provided with high accuracy, variations in force for pressing the rear end surface of the ferrule 800 are reduced. Therefore, sealing between the connected hole 710 and the pipe 110 is stabilized.

(5) Effects of Embodiments

With the ratchet fitting 100 of the present embodiment, because the head 4 and the spring 3 are formed separately, the deformation of the spring 3 is not affected by the head 4. Therefore, when a torque larger than the torque prescribed value is applied to the operating portion 100B, the spring 3 can be deformed uniformly. As a result, the accuracy of the torque prescribed value of the ratchet fitting 100 is improved.

Further, the contacted surface e1 of the spring 3 and the contacted surface E1 of the head 4 come into contact with each other, so that a rotational force is transmitted between the spring 3 and the head 4. In this case, when the spring 3 is viewed in the axial direction, the contact surface e1 is located at the intermediate position between the protrusions 310, 320 that are deformed inwardly and the annular portion 300 that is deformed outwardly. That is, a rotational force is transmitted from the head 4 to a position so as not to cause the spring 3 to be deformed. Therefore, the transmission of the rotational force between the head 4 and the spring 3 does not affect the deformation of the spring 3. As a result, the spring 3 can be deformed more uniformly.

(6) Other Embodiments

Figure 10:
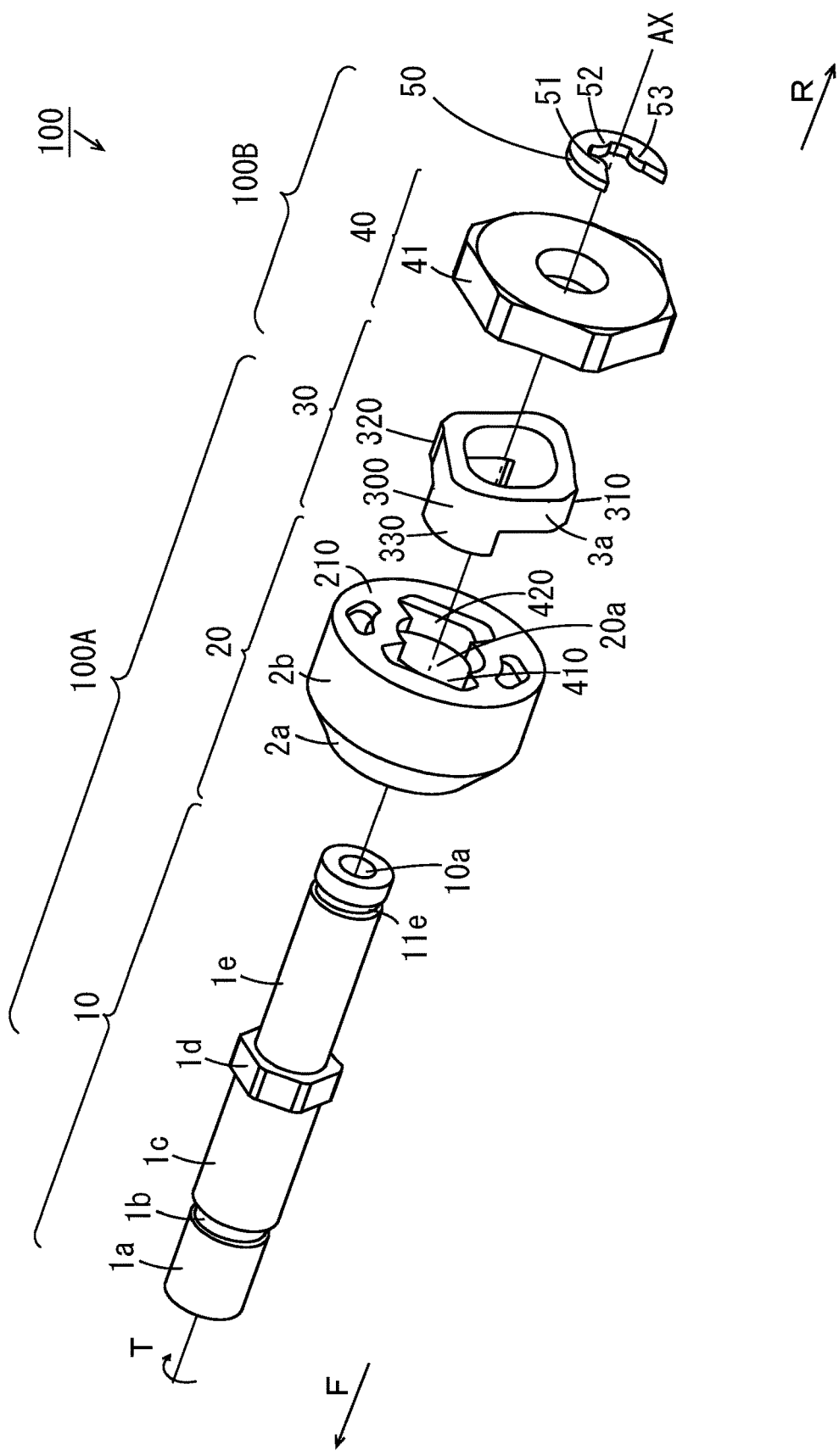
FIG. 10 is an exploded perspective view of a ratchet fitting according to another embodiment as viewed obliquely downwardly.
Figure 11:
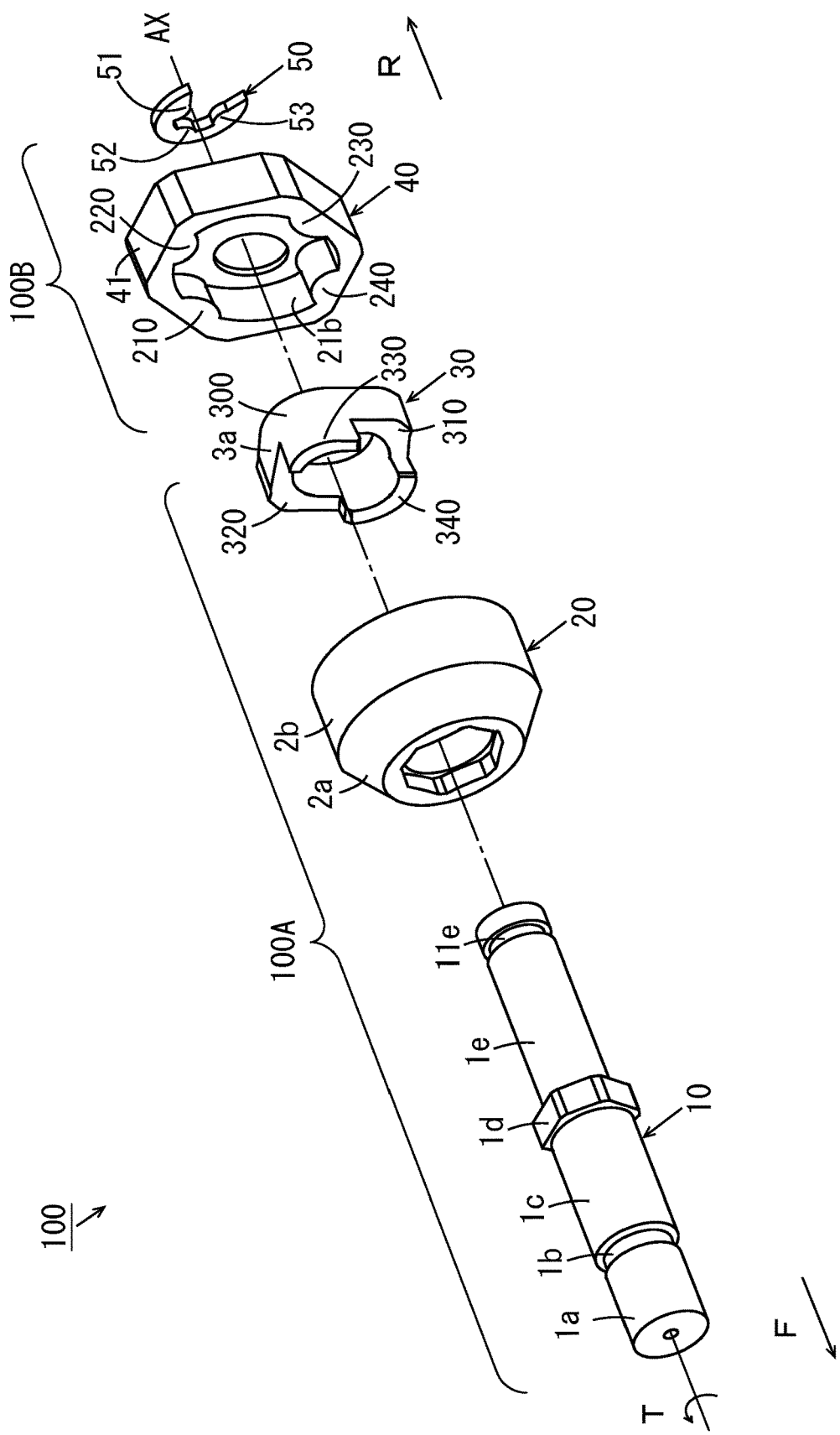
FIG. 11 is an exploded perspective view of the ratchet fitting according to the other embodiment as viewed from an obliquely forward position.

FIG. 10 is an exploded perspective view of a ratchet fitting according to another embodiment as viewed obliquely downwardly. FIG. 11 is an exploded perspective view of the ratchet fitting according to the other embodiment as viewed from an obliquely forward position. In FIGS. 10 and 11, forward F and rearward R are respectively indicated by the arrows.

The ratchet fitting 100 of FIGS. 10 and 11 includes a male nut 10, a main body 20, a spring 3, a head 40 and a fixing plate 50. In the present embodiment, the male nut 10, the main body 20, the spring 30 and the fixing plate 50 constitute a screw portion 100A, and the head 40 constitutes an operating portion 100B.

The configurations of the male nut 10, the spring 30 and the fixing plate 50 are similar to the configurations of the male nut 1, the spring 3 and the fixing plate 5 of FIGS. 2 and 3. In the spring 30, convex portions 330, 340 are arranged forwardly, and an annular portion 300 and protrusions 310, 320 are arranged rearwardly.

As shown in FIG. 10, in the main body 20, concave portions 410, 420 similar to the concave portions 410, 420 of the head 4 of FIG. 3 are provided. Convex portions 330, 340 of the spring 30 are fitted to the concave portions 410, 420 of the main body 20.

As shown in FIG. 11, the head 40 is provided with an opening 21*b* and projections 210, 220, 230, 240 similar to the opening 21*b* and the projections 210, 220, 230, 240 of the main body 2 of FIG. 2. The spring 30 is accommodated in the opening 21*b* of the head 40. In this state, the protrusions 310, 320 of the spring 30 engage with the projections 210, 220, 230, 240 of the head 40 in a rotation direction.

In the ratchet fitting 100 of FIGS. 10 and 11, the main body 20 and the spring 30 are non-rotatably fixed. When a torque equal to or smaller than a torque prescribed value is applied in the fastening direction T of the head 40, the male nut 10, the main body 20 and the spring 30 rotate integrally with the head 40. When a torque larger than the torque prescribed value is applied in the fastening direction T of the head 40, the engagement between the spring 30 and the head 40 is released, and the head 40 runs idle.

In this case, because the main body 20 and the spring 30 are formed separately, deformation of the spring 30 is not affected by the main body 20. Therefore, when a torque larger than the torque prescribed value is applied to the head 40, the spring 30 can be deformed uniformly. As a result, the accuracy of the torque prescribed value of the ratchet fitting 100 is improved.

(7) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the main body 2 or the head 40 is an example of an engaging member, the spring 3 or the spring 30 is an example of an elastic member, and the head 4 or the main body 20 is an example of a holding member. The convex portions 330, 340 are an example of a first fitting portion, the convex portion 330 is an example of a first convex portion, and the convex portion 340 is an example of a second convex portion. The concave portions 410, 420 are an example of a second fitting portion, the concave portion 410 is an example of a first concave portion, and the concave portion 420 is an example of a second concave portion. The protrusion 310 is an example of a first protrusion, and the protrusion 320 is an example of a second protrusion. The contact surface e1 is an example of a first contact surface, the contacted surface E1 is an example of a second contact surface, the center of each of the protrusions 310, 320 in the rotation direction is an example of a first portion, and the center of the annular portion 300 in the rotation direction is an example of a second portion.

(8) Aspects

It is understood by those skilled in the art that the plurality of above-mentioned illustrative embodiments are specific examples of the below-mentioned aspects.

(Item 1) A ratchet fitting according to one aspect used for connecting a pipe of a chromatograph includes a screw portion that is rotatable about an axis extending in one direction, and an operating portion that applies a torque around the axis to the screw portion, wherein one of the screw portion and the operating portion has an engaging member having an inner peripheral surface, another one of the screw portion and the operating portion has an elastic member having an outer peripheral surface and a holding member formed separately from the elastic member, projection projecting inwardly is provided on the inner peripheral surface of the engaging member, a protrusion protruding outwardly is provided on the outer peripheral surface of the elastic member, the elastic member and the engaging member are fitted such that a rotational force is transmittable to each other due to engagement of the projection and the protrusion and engagement between the projection and the protrusion is releasable due to deformation of the elastic member, the elastic member has a first fitting portion, the holding member has a second fitting portion, and the holding member and the elastic member are fitted such that the first fitting portion and the second fitting portion are fitted to each other in a rotation direction.

With the ratchet fitting according to one embodiment, when a torque that is equal to or smaller than a predetermined torque prescribed value is applied to the operating portion, the projection of the engaging member and the protrusion of the elastic member engage with each other in the rotation direction, and the first fitting portion and the second fitting portion are fitted to each other in the rotation direction. Thus, the torque is transmitted from the operating portion to the screw portion. As a result, the screw portion rotates integrally with the operating portion. On the other hand, when a torque larger than the torque prescribed value is applied to the operating portion, the engagement between the projection of the engaging member and the protrusion of the elastic member is released due to deformation of the elastic member. Thus, the operating portion runs idle with respect to the screw portion, and the torque is not transmitted from the operating portion to the screw portion.

With the above-mentioned configuration, because the holding member and the elastic member are formed separately, deformation of the elastic member is not affected by the holding member. Therefore, when a torque larger than the torque prescribed value is applied to the operating portion, the elastic member can be deformed uniformly. As a result, the accuracy of the torque prescribed value of the ratchet fitting is improved.

(Item 2) The ratchet fitting according to item 1, wherein the first fitting portion may have a first contact surface parallel to the axial direction, the second fitting portion may have a second contact surface that is parallel to the axial direction and is capable of coming into contact with the first contact surface of the first fitting portion when the elastic member and the holding member rotate integrally, the elastic member may have a first portion that is deformed inwardly and a second portion that is deformed outwardly due to engagement between the protrusion and the projection, and the first contact surface of the first fitting portion may be located at an intermediate position between the first portion and the second portion in the rotation direction when being viewed in the axial direction.

With the ratchet fitting according to item 2, the first contact surface of the elastic member and the second contact surface of the holding member come into contact with each other, whereby a rotational force is transmitted between the elastic member and the holding member. In this case, the first contact surface is located at an intermediate position between the first portion that is deformed inwardly and the second portion that is deformed outwardly when the elastic member is viewed in the axial direction of the elastic member. A portion that is located at the intermediate position between the first portion and the second portion is hardly deformed. That is, a rotational force is transmitted from the holding member to a position so as to hardly cause the elastic member to be deformed. Therefore, the transmission of the rotational force between the holding member and the elastic member does not affect the deformation of the elastic member. As a result, the elastic member can be deformed more uniformly.

(Item 3) The ratchet fitting according to item 1 or 2, wherein one of the first and second fitting portions may have a convex portion projecting in the axial direction, and another one of the first and second fitting portions may include a concave portion to which the convex portion is fitted.

With the ratchet fitting according to item 3, the rotational force can be transmitted between the elastic member and the holding member with a simple structure and without affecting the deformation of the elastic member.

(Item 4) The ratchet fitting according to item 3, wherein the elastic member may have the convex portion as the first fitting portion, and the holding member may have the concave portion as the second fitting portion.

With the ratchet fitting according to item 4, a rotational force can be transmitted between the elastic member and the holding member without a complicated structure of the deformable elastic member.

(Item 5) The ratchet fitting according to item 4, wherein the convex portion may include first and second convex portions that are provided at positions symmetrical to each other about a rotational center of the elastic member, the concave portion may include first and second concave portions that are provided at positions symmetrical to each other about a rotational center of the holding member, and the elastic member may be rotatable integrally with the holding member with the first and second convex portions respectively fitted to the first and second concave portions.

With the ratchet fitting according to item 5, because a uniform torque is applied in the rotation direction of the elastic member, the elastic member and the holding member can be rotated integrally and stably.

(Item 6) The ratchet fitting according to item 5, wherein the protrusion may have first and second protrusions provided at positions symmetrical to each other about a rotational center of the elastic member, and the first and second protrusions may be provided between the first convex portion and the second convex portion in the rotation direction when being viewed in the axial direction.

With the ratchet fitting according to item 6, when a torque larger than the torque prescribed value is applied to the operating portion, the first and second protrusions are likely to be deformed. Thus, a ratchet mechanism constituted by the elastic member and the engaging member functions smoothly. Further, a rotational force is stably transmitted between the holding member and the elastic member and between the elastic member and the engaging member.

(Item 7) A pipe connecting structure according to another aspect may include a pipe of a chromatograph, a ratchet fitting according to any one of items 1 to 6, and a pipe connector to which the pipe is connected by the ratchet fitting.

With the pipe connecting structure according to item 7, the pipe of the chromatograph can be connected to the pipe connector by the ratchet fitting with use of a torque prescribed value having improved accuracy.

(Item 8) A liquid chromatograph according to another aspect may include a plurality of constituent elements, wherein a pipe may be connected to any of the plurality of constituent elements by the pipe connector according to item 7.

With the liquid chromatograph according to item 8, various constituent elements are connected more reliably.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

I claim:

1. A ratchet fitting used for connecting a pipe of a chromatograph, comprising;
    a screw portion that is rotatable about an axis extending in one direction; and
    an operating portion that applies a torque around the axis to the screw portion, wherein
    one of the screw portion and the operating portion has an engaging member having an inner peripheral surface,
    another one of the screw portion and the operating portion has an elastic member having an outer peripheral surface and a holding member formed separately from the elastic member,
    a projection projecting inwardly is provided on the inner peripheral surface of the engaging member,
    a protrusion protruding outwardly is provided on the outer peripheral surface of the elastic member,
    the elastic member and the engaging member are fitted such that a rotational force is transmittable to each other due to engagement of the projection and the protrusion and engagement between the projection and the protrusion is releasable due to deformation of the elastic member,
    the elastic member has a first fitting portion,
    the holding member has a second fitting portion, and
    the holding member and the elastic member are fitted such that the first fitting portion and the second fitting portion are fitted to each other in a rotation direction.

2. The ratchet fitting according to claim 1, wherein
    the first fitting portion has a first contact surface parallel to the axial direction,
    the second fitting portion has a second contact surface that is parallel to the axial direction and is capable of coming into contact with the first contact surface of the first fitting portion when the elastic member and the holding member rotate integrally,
    the elastic member has a first portion that is deformed inwardly and a second portion that is deformed outwardly due to engagement between the protrusion and the projection, and
    the first contact surface of the first fitting portion is located at an intermediate position between the first portion and the second portion in the rotation direction when being viewed in the axial direction.

3. The ratchet fitting according to claim 1, wherein
    one of the first and second fitting portions has a convex portion projecting in the axial direction, and
    another one of the first and second fitting portions includes a concave portion to which the convex portion is fitted.

4. The ratchet fitting according to claim 3, wherein
    the elastic member has the convex portion as the first fitting portion, and
    the holding member has the concave portion as the second fitting portion.

5. The ratchet fitting according to claim 4, wherein
the convex portion includes first and second convex portions that are provided at positions symmetrical to each other about a rotational center of the elastic member,
the concave portion includes first and second concave portions that are provided at positions symmetrical to each other about a rotational center of the holding member, and
the elastic member is rotatable integrally with the holding member with the first and second convex portions respectively fitted to the first and second concave portions.

6. The ratchet fitting according to claim 5, wherein
the protrusion has first and second protrusions provided at positions symmetrical to each other about a rotational center of the elastic member, and
the first and second protrusions are provided between the first convex portion and the second convex portion in the rotation direction when being viewed in the axial direction.

7. A pipe connecting structure comprising:
a pipe of a chromatograph;
a ratchet fitting according to claim 1; and
a pipe connector to which the pipe is connected by the ratchet fitting.

8. A liquid chromatograph comprising a plurality of constituent elements, wherein
a pipe is connected to any of the plurality of constituent elements by the pipe connector according to claim 7.

* * * * *